United States Patent [19]

Scharf et al.

[11] Patent Number: 5,062,979
[45] Date of Patent: Nov. 5, 1991

[54] SOAP FREE CONVEYOR LUBRICANT THAT GIVES CLEAR SOLUTIONS IN WATER COMPRISING ALKOXYPHOSPHATE ESTER, ALKYL BENZENE SULFONATE AND CARBOXYLIC ACID

[75] Inventors: Rolf Scharf, Monheim; Karl-Heinz Schmitz, Duesseldorf, both of Fed. Rep. of Germany

[73] Assignee: Ecolab Inc., St. Paul, Minn.

[21] Appl. No.: 406,984

[22] Filed: Sep. 13, 1989

[30] Foreign Application Priority Data

Sep. 16, 1988 [DE] Fed. Rep. of Germany ....... 3831448

[51] Int. Cl.$^5$ .......................................... C10M 173/02
[52] U.S. Cl. .................................. 252/49.3; 252/32.5; 252/33.2; 252/49.3; 252/49.8; 252/56 R
[58] Field of Search ................... 252/49.3, 32.5, 56 R, 252/33.2, 49.8

[56] References Cited

U.S. PATENT DOCUMENTS

| | | | |
|---|---|---|---|
| 3,310,489 | 3/1967 | Davis | 252/49.3 |
| 3,860,521 | 1/1975 | Aepli et la. | 252/34.7 |
| 4,486,324 | 12/1984 | Korasec | 252/49.3 |
| 4,521,321 | 6/1985 | Anderson | 252/49.3 |
| 4,604,220 | 8/1986 | Stanton | 252/49.3 |
| 4,769,162 | 9/1988 | Remus | 252/49.3 |
| 4,929,375 | 5/1990 | Rossio et al. | 252/49.3 |

FOREIGN PATENT DOCUMENTS

| | | |
|---|---|---|
| 1015351 | 8/1977 | Canada . |
| 0044458 | 11/1983 | European Pat. Off. . |
| 0137057 | 4/1985 | European Pat. Off. . |

*Primary Examiner*—Prince E. Willis
*Assistant Examiner*—Jerry D. Johnson
*Attorney, Agent, or Firm*—Patrick J. Span; Norvell E. Wisdom; Wayne C. Jaeschke

[57] ABSTRACT

The invention relates to aqueous, clear solution-forming, substantially soap free lubricant compositions and to the use of the lubricant compositions according to the invention, especially as lubricants for the transport of glass bottles or poly(ethylene terephthalate) bottles. The substantially neutral aqueous lubricant compositions (pH 6-8) contain alkyl benzenesulfonates, partial phosphate esters with alkoxylated aliphatic alcohols, and aliphatic carboxylic acids, optionally in addition to typical solubilizers, solvents, foam inhibitors and disinfectants.

14 Claims, No Drawings

SOAP FREE CONVEYOR LUBRICANT THAT GIVES CLEAR SOLUTIONS IN WATER COMPRISING ALKOXYPHOSPHATE ESTER, ALKYL BENZENE SULFONATE AND CARBOXYLIC ACID

Soap-based lubricant preparations are normally used for this purpose.

DE-OS 23 13 330 describes soap-based lubricants containing aqueous mixtures with fatty acid salts and surfactants. The disadvantages of soap-based lubricant preparations of this type are as follows:

1. The lubricant preparations have to contain adequate quantities of ethylenediamine tetraacetic acid, nitrilotriacetate, or other complexing agent to complex the divalent cations that cause water hardness. This prevents the formation of lime soap which would result in blockage of the jets of the automatic lubrication system.
2. High water hardness levels require large quantities of complexing agent in the lubricant preparations so that the amount of soap has to be correspondingly reduced. However, this impairs the lubricating effect of the preparation.
3. Soap-containing lubricant preparations usually foam to a fairly considerable extent because some of the soaps formed in hard water by ion interchange are very difficult to defoam. Overfoaming lubricant is lost during the lubrication of bottle conveyors and can enter the containers to be transported. In addition, foaming interferes with the automatic monitoring of empty bottles on bottle conveyor belts.
4. The use of soft water to avoid the formation of lime soap in the case of products with only a small addition, if any, of complexing agent makes products such as these expensive to use. When softening by cation exchangers, breakthroughs of hardness are by no means rare in practice. In addition, ion exchangers also involve the risk of contamination by germs unless they are disinfected at specified intervals. This can result in lubricant preparations contaminated by microorganisms which in turn can result in contamination of the interior of the containers to be transported and, ultimately, in deterioration of the beverage or food.

DE-OS 36 31 953 describes a process for the care of chain-like bottle conveyors in beverage bottling plants, particularly in breweries. In this process, the chain-like bottle conveyors are lubricated with lubricants based on neutralized fatty amines and are cleaned with cationic cleaning preparations or organic acids. The invention, according to this reference, permits the undisturbed continuous transport of bottles.

EP-PS 0 044 458 describes lubricant preparations which are substantially free from fatty acid soap and which, in addition, contain a carboxylated nonionic surfactant and an acyl sarcosinate. The pH value of the products described in EP-PS 0 044 458 is between 7 and 11 and is thus largely in the neutral to alkaline range.

By contrast, a major object addressed by the present invention is to provide a new lubricant preparation based on anionic surfactants. Another object addressed by the present invention is to provide a lubricant preparation suitable for application to bottle conveyor belts. More particularly, an object addressed by the present invention is to provide a lubricant preparation which is suitable where polyethylene terephthalate bottles are used because the known lubricant preparations, particularly those based on soaps, promote stress cracking after prolonged contact with polyethylene terephthalate bottles. Accordingly, another object addressed by the present invention is to provide a lubricant preparation which does not cause stress cracking, particularly of poly(ethylene terephthalate) bottles.

DESCRIPTION OF THE INVENTION

In this description, except in the operating examples and where expressly stated to the contrary, all numbers specifying amounts of materials or conditions of reaction or use are to be understood as modified by the term "about".

One embodiment of the present invention is an aqueous, substantially soap free lubricant composition, based on anionic surfactants of alkyl benzenesulfonates, partial esters of phosphoric acid with alkyoxylated aliphatic alcohols, and aliphatic carboxylic acids, which is at least comparable in its lubricating effect with soap-containing lubricant preparations or lubricant preparations based on nonionic surfactants, without having any of the disadvantages noted above for such lubricants, and which can be diluted to any desired degree with optically clear industrial water supplies of any degree of hardness to give an optically clear solution.

More specifically, this embodiment of the present invention has a pH value between 6 and 8 and comprises, or preferably consists essentially of, water and:

(a) alkyl benzenesulfonates containing about 10 to about 18 carbon atoms in the alkyl part, with cations that are alkali metal ions, ammonium ions, and/or alkanolammonium ions containing 1 to about 14 carbon atoms in the alkanolamine part;

(b) partially esterified phosphoric acids or phosphates corresponding to general formula (I)

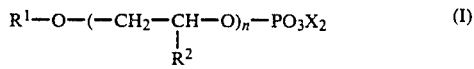

in which $R^1$ is a linear and/or branched, saturated or mono- and/or poly-unsaturated aliphatic hydrocarbon radical containing about 12 to about 18 carbon atoms, $R^2$ is H or $CH_3$, X is hydrogen and/or an alkali metal, and n is an integer in the range from about 8 to about 12; and (c) linear and/or branched, saturated and/or mono- and/or polyunsaturated aliphatic carboxylic acids containing about 6 to about 22 carbon atoms and having a titer (solidification point) of not more than 20° C.; and, optionally may also contain (d) conventional solubilizers, solvents, foam inhibitors, and/or disinfectants, with component (a) and component (b) being present in a ratio by weight of 3:1 to 1:3 and component (c) being present in a ratio by weight to the sum of components (a) and (b) of from 1:20 to 1:4.

The excellent lubricating effect of compositions according to the invention is believed to be attributable to the combined use of alkyl benzenesulfonates and partially esterified phosphates in addition to aliphatic carboxylic acids. Where alkyl benzenesulfonate and alkanol phosphates are used without the aliphatic carboxylic acids, the lubricating effect is inadequate.

Concentrated aqueous lubricant preparations according to the invention preferably contain component (a)

(alkyl benzenesulfonates) in quantities of 0.02 to 15% by weight, component b (phosphoric acids or phosphates) in quantities of from 0.02 to 15% by weight and component c (carboxylic acids) in quantities of from 0.01 to 10% by weight, based in each case on the composition as a whole. However, the above-mentioned ratios of the individual components to one another must also be observed. The following quantitative ranges of the components are more preferred in concentrates for use according to the invention: component a: 6 to 12% by weight; component b: 5 to 10% by weight; component c: 1 to 5% by weight.

The choice of the alkyl benzenesulfonates, alkoxylated alkanol phosphates and alkanecarboxylic acids is essentially constrained by the requirement that the entire composition form water-clear solutions at room temperature (20° C). The expression "titer" in the context of the present invention stands for the designation used in fat analyses for the solidification point of a fat or fatty oil. Carboxylic acids, in particular aliphatic acids, having a solidification point above 20° C. are not suitable for the purposes of the invention because their use does not give lubricant preparations that will reliably produce optically clear solutions in water.

The aqueous, clear solution-forming, substantially soap free lubricant preparations according to the invention are not normally used as concentrates, but rather as dilute aqueous solutions for the lubrication of bottle conveyor belts. The lubricant preparations according to the invention can be rinsed off almost completely from the conveyor belts after use. Accordingly, where the lubricant preparations according to the invention are used in the neutral range pH, no lime soaps are formed.

In one preferred embodiment of the invention, lubricant preparations are characterized by the use of alkyl benzenesulfonates selected from decyl benzenesulfonate and/or dodecyl benzenesulfonate. It is a key feature of this embodiment of the present invention that the alkyl benzenesulfonates have a certain lubricating effect of their own. For example, short-chain alkyl sulfonates are not suitable for the purposes of the invention because their lubricating effect is inadequate.

Another valuable embodiment of the invention is one in which the substituent $R^1$ in general formula (I) is the hydrocarbon radical of natural and/or synthetic aliphatic alcohols selected from dodecanol, tridecanol, tetradecanol, pentadecanol, hexadecanol, heptadecanol, octadecanol, 2-butyl octanol, 2-pentyl nonanol, 2-hexyl decanol, 2-heptyl undecanol, 9-octadecen-1-ol, and 9,12-octadecadien-1-ol. The substituent $R^2$ in general formula (I) is hydrogen and/or a methyl radical. Accordingly, the alkoxylated alkanol phosphates to be used in accordance with the invention are preferably prepared from aliphatic alcohols and ethylene oxide and/or propylene oxide, with subsequent phosphation.

In another embodiment of the present invention, the phosphates are used in the form of potassium and/or sodium salts. In this case, X in general formula (I) represents potassium and/or sodium. Accordingly, lime soaps are not likely to be formed where the lubricant preparations according to the invention are used in the substantially neutral range, even in hard water.

Another key feature of the lubricant preparations is the presence of alkanecarboxylic acids selected from natural and/or synthetic carboxylic acids. Accordingly, natural aliphatic acids may also be used in addition to synthetic carboxylic acids. The natural acids do not normally occur in pure form and are therefore preferably used for the purposes of the invention in the form of mixtures which may emanate from a variety of natural sources. Accordingly, the carboxylic acids are preferably selected from hexanoic acid, heptanoic acid, octanoic acid, nonanoic acid, 9-hexadecenoic acid, 9,12-octadecadienoic acid, 9,12,15-octadecatrienoic acid, 5,8,11,14-eicosatetraenoic acid, 4,8,12,15,19-docosapentaenoic acid, sperm oil aliphatic acids, coconut oil aliphatic acids, sunflower oil aliphatic acids, linseed oil aliphatic acids, and/or rapeseed oil aliphatic acids. Carboxylic acids are suitable for the lubricant preparations according to the invention only when they have a titer of not more than 20° C.

The lubricant preparations may also contain solubilizers, foam inhibitors, and/or disinfectants. In one embodiment of the invention it is preferred to use water-miscible or water-soluble solubilizers as the solubilizer component. Accordingly, it is particularly preferred to use urea, ethanol, n-propanol, i-propanol, n-butanol, ethylene glycol, and/or butyl diglycol, or several of these solubilizers as the solubilizer component in a quantity of from 50 to 100 parts by weight for each 100 parts by weight of the total quantity of benzenesulfonate component (a), phosphate component (b), and carboxylic acid component (c). Solubilizers such as these or even solvents may used to prepare clear solution-forming lubricant preparations. Solubilizers of the type in question are preferable for the purposes of the invention when they do not impair the lubricating effect of the lubricant preparations.

Lubricant preparations according to the invention may optionally contain foam inhibitors, preferably in a quantity of from 5 to 25 parts by weight for each 100 parts by weight of the total quantity of required components (a), (b), and (c). Although it is possible in principle to use foam inhibitors known from the prior art, it is preferred in one embodiment of the invention to use triisobutyl phosphate in the above-mentioned quantities as the foam inhibitor. Triisobutyl phosphate has the particular advantage that it assists the lubricating effect of the lubricant preparation.

Disinfectants which may be present in the lubricant preparations according to the invention are described, for example, in Ullmanns *Encyklopadie der technischen Chemie*, 4th Edition, Vol. 7, pages 41–58. According to the invention, disinfectants are preferably used when the storage containers or the conveyor belts are in danger of contamination with germs. Accordingly, one particular embodiment of the lubricant preparations according to the invention is characterized in that glutaraldehyde, 5-chloro-2-methyl-3-oxo-4-isothiazoline, 2-methyl-3-oxo-4-isothiazoline, sodium pyridine thiol-1-oxide, or mixtures thereof are used as a disinfectant component, preferably in quantities of from 5 to 50 parts by weight per 100 parts by weight of the total quantity of components (a), (b), and (c) as defined above.

It is highly preferable, to promote easy practical use of the lubricant compositions according to the invention, that they have a viscosity below 300 mPa.s so that they may be accurately metered by commercially available pumps. If this viscosity value is exceeded, the quantities to be used cannot always be reproducibly and uniformly dispensed by standard metering pumps. Accordingly, clear solution-forming, substantially soap free lubricant preparations according to the invention are preferably prepared by regulating the quantity of water and the quantity of solubilizer present therein, if any, in such a way that the lubricant preparation has a viscosity of less than 300 mPa.s. The ratios by weight of solubilizer to water are variable as desired as long as a clear solution-forming, substantially soap free lubricant preparation is obtained.

The aqueous, clear solution-forming, substantially soap free lubricant preparations according to the invention are normally not used as concentrates, but rather in the form of heavily diluted aqueous solutions. Accordingly, one embodiment of the present invention is characterized in that clear solution-forming, substantially soap free lubricant preparations are used as conveyor lubricants in the form of aqueous solutions containing from 0.2 to 1% by weight of composition(s) as specified above. Alternatively stated, the lubricant solutions to be used in practice normally contain from 0.04 to 0.2% by weight in total of the three necessary components (a), (b), and (c) according to the invention as defined above, in addition to any other solubilizers, solvents, foam inhibitors and/or disinfectants that may be present. The concentrated lubricant composition according to the invention is most preferably used in the form of an about 0.5% by weight aqueous solution for lubricating conveyor installations.

In one particular embodiment of the present invention, the clear solution-forming, aqueous, substantially soap free lubricant compositions are used during the transport of glass bottles and/or polyethylene terephthalate bottles by conveyor installations.

The practice of the invention may be further appreciated from the following non-limiting examples.

EXAMPLES

General Procedures

Tests for measuring frictional resistance were carried out under the following conditions on a pilot-scale bottle conveyor belt: Measurement, using a dynamometer, of the tensile stress from the frictional resistance of 20 water-filled 0.5 liter "Euro" beer bottles. Bottle transport speed approx. 1 meter/second. Spraying of the bottle conveyor belt with an aqueous solution, made with water having a hardness of 16° on the German scale ("Gh") and containing 0.5% by weight of concentrated lubricant composition according to the invention, continuously for 20 seconds, followed by 20 seconds without spray, then repeating this on-off cycle.

Spray nozzle throughput: 5 l/h.

The friction coefficient is defined as $F_R/F_N$, where $F_R$=the tensile stress measured for each bottle and $F_N$=the mass of the filled bottle in grams.

Foaming behaviour on bottle conveyor belt is observed and scored as follows:
0=no foam
1=occasional foam bubbles
2=some foam, but not troublesome
3=foaming, enough to be troublesome
4=heavy foaming (foam "mountain" below belt)

The foaming tendency was also determined in accordance with DIN 53 902, according to which foam is produced by beating the solutions in a standing cylinder with a perforated plate attached to a handle. The test was carried out in water of 16° Gh. An amount of 0.5% by weight of concentrated lubricant compositions was used. The volume of foam in milliliters ("ml") is determined after 20 beats. Compositions of the concentrated lubricant compositions in the examples and comparison examples below are % by weight.

EXAMPLE 1

The concentrated lubricant composition contained the following ingredients: 7% of sodium dodecyl benzenesulfonate (component a); 9% of disodium phosphonate of mixed monoesters of phosphoric acid with alcohol molecules prepared by condensing an average of 10 moles of ethylene oxide per mole of alcohol with a natural mixture of $C_{12-18}$ straight chain saturated alcohols (component b); 3% of the natural mixture of acids derivable from sunflower oil (component c); 2% of triisobutyl phosphate; 10% of urea; 10% of isopropanol; and 59% water.

A friction coefficient of 0.06 was calculated. A score of 1 was observed for foaming behavior on the belt.

The volume of foam in the foam beating apparatus was 200 ml.

EXAMPLE 2

The concentrated lubricant composition was the same as for Example 1, except that it contained only 1% of component c and 61% of water.

A friction coefficient of 0.100 was calculated. A score of 1 was observed for foaming behavior on the belt.

EXAMPLE 3

The concentrated lubricant composition was the same as for Example 1, except that it contained 2% of component c and 60% of water.

A friction coefficient of 0.08 was calculated. A score of 1 was observed for foaming behavior on the belt.

The volume of foam in the foam beating apparatus was 240 ml.

EXAMPLE 4

The concentrated lubricant composition was the same as for Example 1, except that it contained 4% of component c and 58% of water.

A friction coefficient of 0.07 was calculated. A score of 1 was observed for foaming behavior on the belt.

The volume of foam in the foam beating apparatus was 160 ml.

EXAMPLE 5

The concentrated lubricant composition was the same as for Example 1, except that it contained 5% of component c and 57% of water.

A friction coefficient of 0.07 was calculated. A score of 1 was observed for foaming behavior on the belt.

The volume of foam in the foam beating apparatus was 120 ml.

EXAMPLE 6

The concentrated lubricant composition contained the same components a, b, and c in the same amounts as for Example 1, and it also contained 4% of glutaraldehyde, 2% of nitrilotriacetate, 10% of butyl diglycol, and 65% of water.

A friction coefficient of 0.09 was calculated. A score of 1 was observed for foaming behavior on the belt. The volume of foam in the foam beating apparatus was 250 ml.

EXAMPLE 7

The concentrated lubricant composition contained 3% of fractionated saturated straight chain aliphatic acids having a chain distribution of approximately 2% $C_6$, 60% $C_8$, 35% $C_{10}$ and 1% $C_{12}$; the same types and amount of components a and b as in Example 1; 2% of diethylenetriamine pentamethylene phosphonate; 10% of urea; 1% of disinfectant (mixed 5-chloro-2-methyl-3-oxo-4-isothiazoline and 2-methyl-3-oxo-4-isothiazoline); 3% of iso-propanol; and 65% of water.

A friction coefficient of 0.10 was calculated. A score of 2-3 was observed for foaming behavior on the belt. The volume of foam in the foam beating apparatus was 280 ml.

EXAMPLE 8

The concentrated lubricant composition contained 2.5% of mixed aliphatic acids, comprising about 8% of saturated $C_{14-18}$ acid(s), 20% of monounsaturated $C_{18}$ acid(s), 62% of diunsaturated $C_{18}$ acid(s), 1% of triunsaturated $C_{18}$ acid(s), and 1% of $C_{>18}$ acid; the same types and amounts of components a and b as for Example 1; 2% of triisobutyl phosphate; 10% of urea; 10% of iso-propanol; and 59.5% of water.

A friction coefficient of 0.067 was calculated. A score of 2 was observed for foaming behavior on the belt. The volume of foam in the foam beating apparatus was 260 ml.

EXAMPLE 9

The concentrated lubricant composition contained 3% of mixed aliphatic acids, comprising about 1% of $C_6$ acid(s), 98% of $C_8$ acid(s), and 1% of $C_{10}$ acid(s); the same types and amounts of components a and b as for Example 1; 2% of triisobutyl phosphate; 10% of urea; 10% of isopropanol; and 59% of water.

A friction coefficient of 0.068 was calculated. A score of 2-3 was observed for foaming behavior on the belt. The volume of foam in the foam beating apparatus was 320 ml.

EXAMPLE 10

The concentrated lubricant composition contained 3% of mixed aliphatic acids, comprising about 2% of $C_6$ acid(s), 60% of $C_8$ acid(s), 35% of $C_{10}$ acid(s), and 3% of $C_{12}$ acid(s); the same types and amounts of components a and b as for Example 1; 2% of triisobutyl phosphate; 10% of urea; 10% of iso-propanol; and 59% of water.

A friction coefficient of 0.068 was calculated. A score of 2-3 was observed for foaming behavior on the belt. The volume of foam in the foam beating apparatus was 400 ml.

COMPARISON EXAMPLE 1

The concentrated lubricant composition contained 14% of aliphatic acid(s), comprising about 18% of saturated $C_{14-18}$ acid(s), 25% of monounsaturated $C_{18}$ acid(s), 48% of diunsaturated $C_{18}$ acid(s), 7% of triunsaturated $C_{18}$ acids, and 2% of $C_{>18}$ acids: 4% of potassium hydroxide; 12% of triethanolamine; 15% of sodium dodecyl benzenesulfonate; 3% of a condensate of ethylenediamine with 30 moles of ethylene oxide and 60 moles of propylene oxide per mole of ethylenediamine; 1% of an alkoxylate of two moles of ethylene oxide per mole of alcohol with a technical mixed oleyl-cetyl alcohol having an iodine value of 80-85 and comprising 0-2% $C_{12}$, 2-7% $C_{14}$, 8-15% $C_{16}$, 75-85% $C_{18}$, and 0-2% $C_{20}$ alcohol(s); 3% of monoethanolamine; 2% of ethylenediamine tetraacetate; 5% of iso-propanol; and 41% of water. (The potassium hydroxide and acids in this mixture react at least partially to form a soap mixture.)

A friction coefficient of 0.11 was calculated. A score of 4 was observed for foaming behavior on the belt.

The volume of foam in the foam beating apparatus was 490 ml.

The 0.5% by weight solution of the lubricant composition in water of 16° Gh was not water-clear because of flocculation.

COMPARISON EXAMPLE 2

The concentrated lubricant composition contained 21% of the same material as component b in Example 1; 10% of urea; 10% of iso-propanol; and 59% of water.

A friction coefficient of 0.098 was calculated. A score of 1 was observed for foaming behavior on the belt.

The volume of foam in the foam beating apparatus was 300 ml.

The 0.5% by weight solution of the lubricant composition in water of 16° Gh was not water-clear because of flocculation.

COMPARISON EXAMPLE 3

The concentrated lubricant composition contained 21% of sodium dodecyl benzenesulfonate; 10% of urea; 10% of iso-propanol; and 59% of water.

A friction coefficient of 0.137 was calculated. A score of 4 was observed for foaming behavior on the belt.

The volume of foam in the foam beating apparatus was 600 ml.

The 0.5% by weight solution of the lubricant composition in water of 16° Gh was not water-clear because of flocculation.

COMPARISON EXAMPLE 4

The concentrated lubricant composition contained 12% of the same material as component b in Example 1; 9% of sodium dodecyl benzenesulfonate; 10% of urea; 10% of isopropanol; and 59% of water.

A friction coefficient of 0.100 was calculated. A score of 2 was observed for foaming behavior on the belt.

The volume of foam in the foam beating apparatus was 400 ml.

The 0.5% by weight solution of the lubricant composition in water of 16. Gh was not water-clear because of flocculation.

COMPARISON EXAMPLE 5

The concentrated lubricant composition contained 9% of the same material as component b in Example 1; 7% of sodium dodecyl benzenesulfonate; 5% of triisobutyl phosphate; 10% of urea; 10% of iso-propanol; and 59% of water.

A friction coefficient of 0.096 was calculated. A score of 1 was observed for foaming behavior on the belt.

The volume of foam in the foam beating apparatus was 350 ml.

What is claimed is:

1. An aqueous, optically clear, substantially soap free lubricant composition having a pH value in the range from about 6 to about 8, capable of being diluted with optically clear hard water to form an optically clear solution therein, and comprising water and:
   (a) from about 0.02 to about 15% by weight based on the total composition of alkyl benzene sulfonate molecules containing 10 to 18 carbon atoms in the alkyl part and having cations that are selected from the group consisting of alkali metal ions, ammonium ions and alkanolammonium ions containing 1 to about 14 carbon atoms in the alkanolamine part;

(b) from about 0.02 to about 15% by weight based on the total composition of partially esterified phosphonic acid or phosphate molecules corresponding to general formula (I)

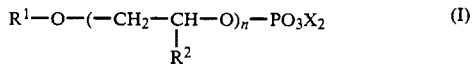

in which $R^1$ is selected from the group consisting of aliphatic monovalent hydrocarbon radicals containing about 12 to about 18 carbon atoms, $R^2$ is H or $CH_3$, X is hydrogen or an alkali metal, and n is an integer in the range of about 8 to about 12; and (c) from about 0.01 to about 10% by weight of the total composition of molecules selected from the group consisting of aliphatic carboxylic acids containing about 6 to about 22 carbon atoms and having a titer of not more than 20° C.; and, optionally, (d) conventional solubilizers, solvents, foam inhibitors, disinfectants, or mixtures thereof, component (a) and component (b) being present in a ratio by weight of about 3:1 to about 1:3 and component (c) being present in a ratio by weight to the sum of components (a) and (b) of from about 1:20 to about 1:4.

2. A lubricant composition as claimed in claim 1, wherein component (a) is selected from decyl benzenesulfonates and dodecyl benzenesulfonates.

3. A lubricant composition as claimed in claim 1, wherein the substituent $R^1$ in general formula (I) is the hydrocarbon radical of an alcohol selected from the group consisting of dodecanol, tridecanol, tetradecanol, pentadecanol, hexadecanol, heptadecanol, octadecanol, 2-butyl octanol, 2-pentyl nonanol, 2-hexyl decanol, 2-heptyl undecanol, 9-octadecen-1-ol and 9,12-octadecadian-1-ol.

4. A lubricant composition as claimed in claim 1, wherein X in general formula (I) is potassium or sodium.

5. A lubricant composition as claimed in claim 1 wherein component (c) is selected from the group consisting of hexanoic acid, heptanoic acid, octanoic acid, nonanoic acid, 9-hexadecenoic acid, 9,12-octadecadienoic acid, 9,12,15-octadecatrienoic acid, 5,8,11,14-eicosatetraenoic acid, 4,8,12,15,19-docosapentaenoic acid, sperm oil aliphatic acid, coconut oil aliphatic acid, sunflower oil aliphatic acid, linseed oil aliphatic acid, and rapeseed oil aliphatic acid.

6. A lubricant composition as claimed in claim 1, wherein the amount of component (a) is from about 6 to about 12 by weight of the total composition, the amount of component (b) is from about 5 to about 10% by weight of the total composition, and the amount of component (c) is from about 1 to about 5% by weight of the total composition.

7. A lubricant composition as claimed in claim 1 which contains component (d), in a total quantity of from about 50 to about 100 parts by weight per 100 parts by weight of the total quantity of components (a), (b), and (c), selected from the group consisting of urea, ethanol, n-propanol, i-propanol, n-butanol, ethylene glycol, and butyl diglycol.

8. A lubricant composition as claimed in claim 1 which contains, as component (d), triisobutyl phosphate in a quantity of from about 5 to about 25 parts by weight per 100 parts by weight of the total quantity of components (a), (b), and (c).

9. A lubricant composition as claimed in claim 8 which has a viscosity of not more than about 300 millipascal seconds at ambient conditions.

10. A lubricant composition as claimed in claim 7 which has a viscosity of not more than about 300 millipascal seconds at ambient conditions.

11. A lubricant composition as claimed in claim 6 which has a viscosity of not more than about 300 millipascal seconds at ambient conditions.

12. A lubricant composition as claimed in claim 1 which has a viscosity of not more than about 300 millipascal seconds at ambient conditions.

13. A lubricant composition as claimed in claim 1 which contains component (d), in a quantity of from about 5 to about 50 parts by weight per 100 parts by weight of the total quantity of components (a), (b), and (c), selected from the group consisting of glutaraldehyde, 5-chloro-2-methyl-3-oxo-4-isothiazoline, 2-methyl-3-oxo-4-isothiazoline, and sodium pyridine thiol-1-oxide.

14. In a process comprising lubricating continuous conveyors of vessels for containing food or beverages, the improvement wherein the lubricant used is an aqueous, optionally clear, substantially soap free lubricant composition having a pH value in the range from about 6 to about 8, and comprises water and:

(a) from about 0.02 to about 15% by weight based on the total composition of alkyl benzenesulfonate molecules containing about 10 to about 18 carbon atoms in the alkyl part and having cations there are selected from the group consisting of alkali metal ions, ammonium ions, and alkanolammonium ions containing 1 to about 14 carbon atoms in the alkanolamine part;

(b) from about 0.02 to about 15% by weight based on the total composition of partially esterified phosphonic acid or phosphate molecules corresponding to general formula (I)

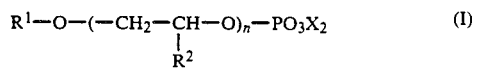

in which $R^1$ is selected from the group consisting of aliphatic monovalent hydrocarbon radicals containing about 12 to about 18 carbon atoms, $R^2$ is H or $CH_3$, X is hydrogen or an alkali metal, and n is an integer in the range from about 8 to about 12; and (c) from about 0.01 to about 10% by weight of the total composition of molecules selected from the group consisting of aliphatic carboxylic acids containing about 6 to about 22 carbon atoms and having a titer of not more than about 20° C.; and, optionally, (d) conventional solubilizers, solvents, foam inhibitors, disinfectants, or mixtures thereof, component (a) and component (b) being present in a ratio by weight of about 3:1 to about 1:3 and component (c) being present in a ratio by weight to the sum of components (a) and (b) of from about 1:20 to about 1:4.

* * * * *

UNITED STATES PATENT AND TRADEMARK OFFICE
CERTIFICATE OF CORRECTION

PATENT NO. : 5,062,979

DATED : November 5, 1991

INVENTOR(S) : Rolf Scharf and Karl Heinz Schmitz

It is certified that error appears in the above-identified patent and that said Letters Patent is hereby corrected as shown below:

Column 1, before the first paragraph beginning at line 8, insert the following omitted first page of the specification:

- Field of the Invention

This invention relates to an aqueous, substantially soap free lubricant preparation soluble in water to give a clear solution, to a process for its production and to its use as a lubricant in conveyor installations. The lubricant preparations according to the invention may be used in dilute aqueous form, irrespective of water hardness, in lubrication systems for conveyor installations for glass and plastic bottles, cans, glasses, barrels, cardboard packs and the like.

Statement of related Art

In bottle and barrel handling areas of beverage factories and in the packing of foods, plate-type conveyor belts or other conveyor installations are normally used for the transport of the containers, these conveyors being lubricated and kept clean by spraying with suitable aqueous lubricant preparations, preferably via automatic lubrication system. -

UNITED STATES PATENT AND TRADEMARK OFFICE
CERTIFICATE OF CORRECTION

PATENT NO. : 5,062,979
DATED : November 5, 1991
INVENTOR(S) : Rolf Scharf and Karl-Heinz Schmitz It is certified that error appears in the above-identified patent and that said Letters Patent is hereby corrected as shown below:

Column 6, after the last paragraph of Example 2, insert the omitted last paragraph of Example 2:

- The volume of foam in the foam beating apparatus was 280 ml. -

Signed and Sealed this

Seventh Day of September, 1993

*Attest:*

BRUCE LEHMAN

*Attesting Officer*　　　*Commissioner of Patents and Trademarks*